(12) United States Patent
Reed et al.

(10) Patent No.: US 9,419,293 B2
(45) Date of Patent: Aug. 16, 2016

(54) SYSTEMS AND METHODS FOR MEASURING HIGH FREQUENCY RESISTANCE IN A FUEL CELL SYSTEM

(71) Applicant: GM GLOBAL TECHNOLOGY OPERATIONS LLC, Detroit, MI (US)

(72) Inventors: David J. Reed, Fairport, NY (US); Angelo T. Caruso, Pittsford, NY (US); Richard P. Corey, Rush, NY (US); Kenneth L. Kaye, Fairport, NY (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 851 days.

(21) Appl. No.: 13/720,758

(22) Filed: Dec. 19, 2012

(65) Prior Publication Data

US 2014/0167775 A1    Jun. 19, 2014

(51) Int. Cl.
*G01N 27/416* (2006.01)
*H01M 8/04* (2016.01)
*B60L 1/02* (2006.01)
*B60L 11/14* (2006.01)
*B60L 11/18* (2006.01)

(52) U.S. Cl.
CPC ............ *H01M 8/04589* (2013.01); *B60L 1/02* (2013.01); *B60L 11/14* (2013.01); *B60L 11/1894* (2013.01); *B60L 11/1898* (2013.01); *H01M 8/04559* (2013.01); *B60L 2200/10* (2013.01); *B60L 2200/32* (2013.01); *B60L 2250/16* (2013.01); *H01M 2250/20* (2013.01); *Y02E 60/50* (2013.01); *Y02T 10/70* (2013.01); *Y02T 10/7077* (2013.01); *Y02T 90/32* (2013.01); *Y02T 90/34* (2013.01)

(58) Field of Classification Search
CPC ... B60L 11/1894; B60L 11/1898; B60L 1/02; B60L 11/14; B60L 2200/10; B60L 2200/32; B60L 2250/16; H01M 2250/20; H01M 8/04559; H01M 8/04589; Y02E 60/50; Y02T 90/32; Y02T 10/7077; Y02T 90/34; Y02T 10/70
USPC .......................................... 320/101; 324/430
See application file for complete search history.

(56) References Cited

U.S. PATENT DOCUMENTS

| | | | | |
|---|---|---|---|---|
| 6,343,207 B1 * | 1/2002 | Hessel | ................. | H04B 1/0003 455/552.1 |
| 6,816,797 B2 * | 11/2004 | Freeman | ................ | G01R 27/02 324/434 |
| 2006/0262889 A1 * | 11/2006 | Kalvaitis | .............. | H05H 1/0081 375/355 |
| 2008/0091367 A1 * | 4/2008 | Rea | ..................... | G01R 31/3662 702/76 |
| 2009/0305099 A1 * | 12/2009 | Chowdhury | ...... | H01M 8/04037 429/413 |
| 2012/0119754 A1 * | 5/2012 | Brenk | .................. | G01R 31/025 324/551 |

* cited by examiner

*Primary Examiner* — Nathaniel Pelton
(74) *Attorney, Agent, or Firm* — Phillips Ryther & Winchester; John P. Davis

(57) ABSTRACT

System and methods for measuring operating parameters of a fuel cell system are presented. In certain embodiments, the systems and methods may be configured to measure a high frequency resistance of a fuel cell system. A method for measuring a high frequency resistance of a fuel cell system may include inducing a current signal and a voltage signal through the FC system at a center frequency using a switched load. The current signal and the voltage signal may then be measured and filtered to isolate the current signal and the voltage signal from noise signals occurring in the FC system. A high frequency resistance of the FC may then be calculated based on the filtered current and voltage signals.

17 Claims, 3 Drawing Sheets

SYSTEMS AND METHODS FOR MEASURING HIGH FREQUENCY RESISTANCE IN A FUEL CELL SYSTEM

TECHNICAL FIELD

This disclosure relates to systems and methods for measuring operating parameters of a fuel cell system. More specifically, but not exclusively, this disclosure relates to systems and methods for measuring high frequency resistance in a fuel cell system included in a vehicle.

BACKGROUND

Passenger vehicles may include fuel cell ("FC") systems to power certain features of a vehicle's electrical and drivetrain systems. For example, a FC system may be utilized in a vehicle to power electric drivetrain components of the vehicle directly (e.g., electric drive motors and the like) and/or via an intermediate battery system. A FC may include a single cell or, alternatively, may include multiple cells arranged in a stack configuration.

In certain circumstances, operating parameters of a FC system may be utilized to monitor and/or control the operation of the FC system. For example, an estimation of a high frequency resistance of a FC system may be utilized to monitor the performance of a proton exchange membrane included in the FC system. Monitoring the performance of the membrane may provide information used in monitoring and/or controlling the performance and operation of the FC system.

Conventionally, high frequency resistance of a FC system may be measured by continuously introducing an alternating current through the FC and/or FC stack using a current source. One or more sensors may measure a voltage and a current signal (e.g., signal ripples) in the FC system attributable to the induced alternating current. Based on the measured voltage and current signals, a high frequency resistance of the FC system may be determined. Such conventional measurement techniques, however, may utilize relatively high power and may be associated with higher computational demands.

SUMMARY

Systems and methods are presented for measuring operating parameters of a FC system. More specifically, certain embodiments disclosed herein may allow for a high frequency resistance of a FC system to be measured using less power and computational demands than conventional methods. In certain embodiments, a system for measuring a high frequency resistance of a FC system may include a switched load configured to be selectively coupled to a FC system at a center frequency. In some embodiments, a current flow may be induced across the FC system when the switched load is coupled to the fuel cell system.

A voltage sensor may be coupled to the FC system and be configured to measure a voltage signal associated with the current flow. Similarly, a current sensor may be coupled to the FC system and be configured to measure a current signal associated with the current flow. A filtering system may receive the voltage signal and the current signal and generate a corresponding filtered voltage signal and a corresponding filtered current signal. In certain embodiments the filtering system may incorporate one or more subset filters of a full multi-rate filter. A processing system coupled to the filtering system may be configured to calculate a high frequency resistance of the FC system based on the filtered voltage and current signals.

In further embodiments, a method for measuring a high frequency resistance of a FC system may include inducing a current signal and a voltage signal through the FC system at a center frequency using a switched load. The current signal and the voltage signal may then be measured. The measured current and voltage signals may be filtered to isolate the current signal and the voltage signal from noise signals occurring in the FC system. In certain embodiments, the current signal and the voltage signal may be filtered using a filtering system incorporating one or more subset filters of a full multi-rate filter. A high frequency resistance of the FC may then be calculated based on the filtered current and voltage signals.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Embodiments of the systems and methods disclosed herein may be utilized to determine one or more operating parameters of a FC system, including a high frequency resistance of the FC system. In certain embodiments, the systems and methods may utilize a switched load (e.g., a switched resistive load) coupled to the FC system. The switched load may be switched at a desired center frequency. The switched load may consume power generated by the FC system, thereby producing current and voltage signals in the FC system at the center frequency of the switched load. A determination may be made if the levels of the current and voltage signals associated with the switched load are sufficient to determine a high frequency resistance of the FC system. If the signal levels are sufficient, a high frequency resistance of the FC may be determined based on the current and voltage signals produced by the switched load. If the levels of the current and voltage signals are not sufficient, an additional excitation current may be induced through the FC system and measurements of further induced current and voltage signals may be taken to determine a high frequency resistance of the FC system. In certain embodiments, the excitation current may be induced in a periodic and/or windowed fashion such that a current is induced through the FC system during one or more measurement periods.

Figure 1:
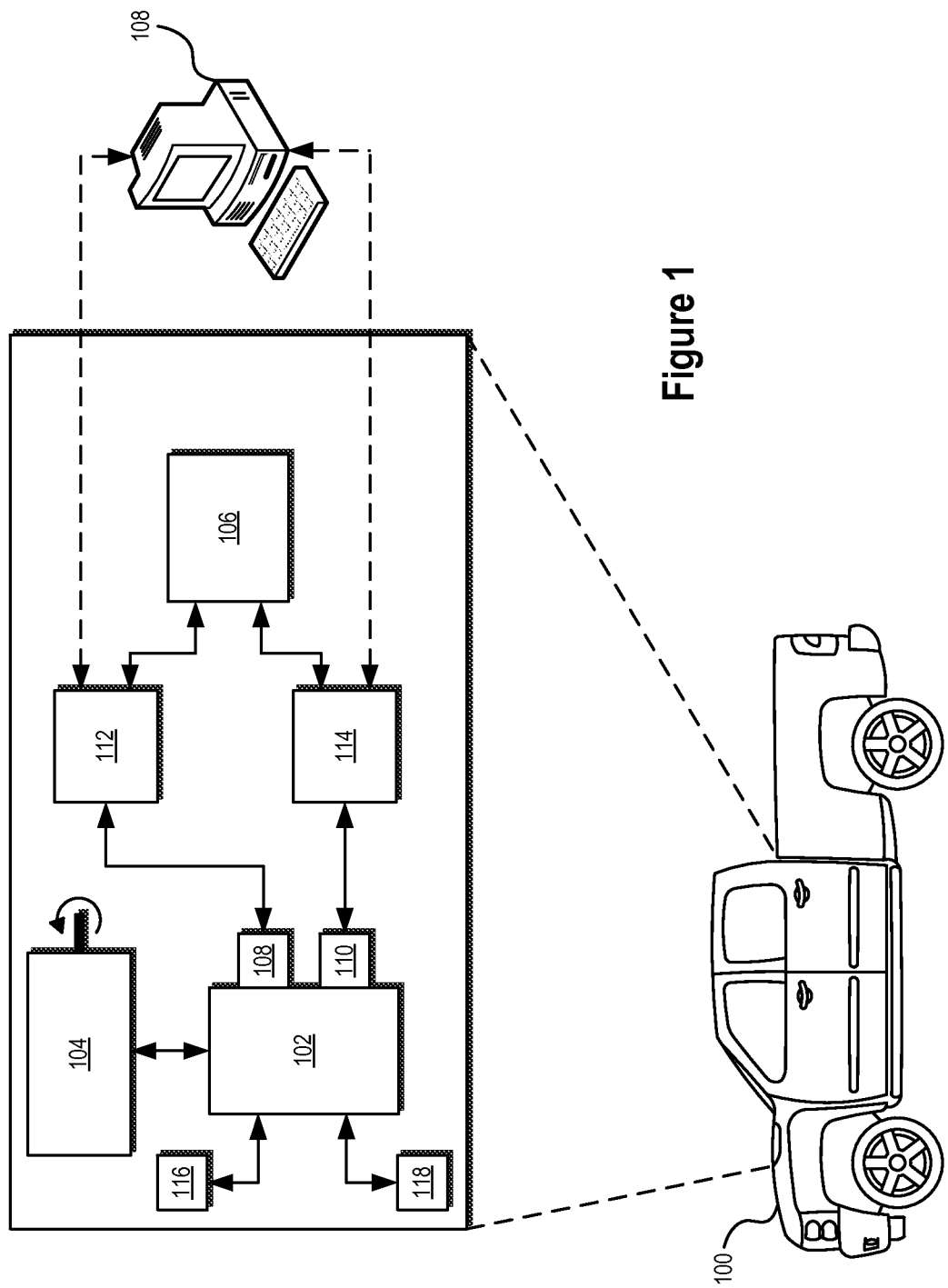
FIG. 1 illustrates an example of a system for measuring operating parameters of a FC system in a vehicle consistent with embodiments disclosed herein.

FIG. 1 illustrates an example of a system for measuring operating parameters of a FC system 102 in a vehicle 100 consistent with embodiments disclosed herein. The vehicle 100 may be a motor vehicle, a marine vehicle, an aircraft, and/or any other type of vehicle, and may include an internal combustion engine ("ICE") drivetrain, an electric motor drivetrain, a hybrid engine drivetrain, and/or any other type of drivetrain suitable for incorporating the systems and methods disclosed herein. As illustrated, vehicle 100 may include a FC system 102 configured to provide electrical power to certain components of the vehicle 100. For example, FC system 102 may be configured to provide power to electric drivetrain components 104 of the vehicle 100. The FC system 102 may include a single cell or multiple cells arranged in a stack configuration.

As illustrated, the FC system 102 may be configured to directly provide power to electric drivetrain components 104. In further embodiments, the FC system 102 may be configured to provide power to electric drivetrain components 104 via an intermediate battery system (not shown). The battery system may be a high voltage battery system and may utilize any suitable battery technology including, for example, lead-acid, nickel-metal hydride ("NiMH"), lithium-ion ("Li-Ion"), Li-Ion polymer, lithium-air, nickel-cadmium ("NiCad"), valve-regulated lead-acid ("VRLA") including absorbed glass mat ("AGM"), nickel-zinc ("NiZn"), molten salt (e.g., a ZEBRA battery), and/or other suitable battery technologies. In further embodiments, the FC system 102 may be configured to provide power to one or more other battery systems (not shown) including low voltage battery systems (e.g., lead-acid 12 V automotive batteries) that supply electric energy to a variety of vehicle 100 systems including, for example, vehicle starter systems (e.g., a starter motor), lighting systems, audio systems, and/or the like.

The FC system 102 may include a FC control system (not shown). The FC control system may be configured to monitor and control certain operations of the FC system 102. For example, the FC control system may be configured to monitor and control charging and/or discharging operations of the FC system 102. In certain embodiments, the FC control system may be utilized to implement, at least in part, the systems and methods disclosed herein. For example, the FC control system may be configured to determine certain operating parameters including a high frequency resistance of the FC system 102.

In further embodiments, an internal vehicle computer system 106 and/or an external computer system 120 may be configured to monitor and control certain operations of the FC system 102 and/or implement, at least in part, the systems and methods disclosed herein. In certain embodiments, the vehicle computer system 106 and/or an external computer system 120 may be communicatively coupled to the FC system 102, and operations of the FC system 102 may be monitored and controlled utilizing any suitable combination of the vehicle computer system 106, external computer system 120, and/or FC control system implementing the systems and methods disclosed herein. In some embodiments, operating parameters relating to the vehicle 100 and/or the FC system 102 may be provided to a user via a display or other interface (e.g., a vehicle infotainment system interface) communicatively coupled to the vehicle computer system 106, the external computer system 120, the FC control system, and/or any other suitable vehicle system.

As illustrated, the FC system 102 may be coupled to a voltage sensor 108 and a current sensor 110 (e.g., a current transducer and/or transformer). The voltage sensor 108 may be configured to measure a voltage across the FC system 102 (e.g., a voltage across a stack of the FC system 102) and the current sensor 110 may be configured to measure a current provided by the FC system 102. In certain embodiments, the voltage sensor 108 and/or the current sensor 110 may be configured to perform high frequency measurements of the FC system 102. An output of the voltage sensor 108 may be coupled to a first filter 112 configured to filter a voltage signal generated by the voltage sensor 108. An output of the current sensor 110 may be coupled to a second filter 114 configured to filter a current signal generated by the current sensor 110. In certain embodiments, the first and second filters 112, 114 may include features such as those described in more detail below in reference to FIG. 2.

Filtered voltage and current signals output respectively by the first filter 112 and the second filter 114 may be provided to the vehicle computer system 106, an external computer system 120, and/or any other suitable system. The vehicle computer system 106, external computer system 120, and/or any other suitable system may utilize the filtered voltage and current signals to calculate various parameters related to the FC system 102 including, for example, a high frequency resistance, as is discussed in more detail below.

The operations of the first filter 112 and the second filter 114 may be performed by any suitable device capable of performing filtering operations (e.g., analog and/or digital filtering operations) including any suitable processing device. In certain embodiments, the first filter 112 and the second filter 114 may be discrete filtering systems. In further embodiments, the functions of the first filter 112 and the second filter 114 may be integrated into a single system. Moreover, in some embodiments, the operations of the first filter 112 and the second filter 114 may be integrated in any suitable system included in the vehicle including, for example, the vehicle computer system 106, an external computer system 120, and/or a FC control system.

To determine a high frequency resistance of the FC system 102, a switched load 116 (e.g., a switched resistive load) may be coupled to the FC system 102. The switched load 116 maybe switched at a desired center frequency that, in certain embodiments, may be a desired center frequency for the high frequency resistance determination. The center frequency may be a frequency within a specific band of excitation frequencies of the FC system 102. In some embodiments, the center frequency may be a frequency that can be used to derive information relating to the high frequency resistance of a proton exchange membrane and/or a state-of-humidification of the proton exchange membrane in a FC system 102. In certain embodiments, the center frequency may be between 500 Hz and 10,000 Hz. For example, the center frequency may be 1000 Hz.

The switched load 116 may consume power generated by the FC system, thereby producing a voltage signal that may be measured by the voltage sensor 108 and/or a current signal that may be measured by the current sensor 110. The signals produced by the switched load 116 measured by the voltage sensor 108 and the current sensor 110 (e.g., current or voltage ripples at the frequency of the switched load 116) may be filtered by the first and/or second filters 112, 114, and be provided to the vehicle computer system 106, an external computer system 120, a FC control system, and/or any other suitable system for processing the filtered voltage and current signals and determining a high frequency resistance of the FC system.

A high frequency resistance may be determined (e.g., by the vehicle computer system 106) based on the filtered voltage and current signals respectively measured by the voltage sensor 108 and the current sensor 110. For example, in accordance with Ohm's law, a high frequency resistance of the FC system 102 may be calculated by dividing the magnitude of the filtered voltage signal (e.g., the voltage ripple waveform) by the magnitude of the filtered current signal (e.g., the current ripple waveform). In certain embodiments, the calculated high frequency resistance may be scaled by a number of cells in the FC system 102 or an active area of a membrane included in the FC system 102 to yield a unit-area-resistance of the membrane.

In some embodiments, prior to calculating the high frequency resistance of the FC system 102 based on the filtered voltage and current signals induced by the switched load 116, a determination may be made as to whether the levels of these signals allow for an accurate calculation of a high frequency resistance (e.g., whether the levels of these signals exceed one or more thresholds). For example, in certain noisy electrical environments, such as the environment that may be present in a high voltage distribution system of vehicle 100, other large current signals may be present in addition to currents induced by the switched load 116. The accuracy of a high frequency resistance calculation may vary based on a relative magnitude of the noise signals to the current and voltage signals induced by the switched load 116. Accordingly, determining that the levels of the signals exceed one or more thresholds may help to ensure accurate high frequency resistance calculations. In certain embodiments, the one or more thresholds may include a threshold of 1 A RMS for the current signal (e.g., the current ripple) and a threshold of 100 mV RMS for the voltage signal (e.g., the voltage ripple), although other suitable thresholds are also contemplated.

If the levels of the signal levels introduced by the switched load 116 are sufficient, the high frequency resistance may be calculated based on the signal levels. If the levels of the current and voltage signals introduced by the switched load 116 are not sufficient, a further excitation current may be induced through the FC system 102. For example, in certain embodiments, an alternating current may be induced through the FC system 102 by a current source 118. In certain embodiments, the current source may include one or more end cell heaters associated with the FC system 102. Voltage and current signals in the FC system 102 associated with the additional excitation current may be measured, filtered, and processed to determine a high frequency resistance in the manner detailed above.

In certain embodiments, an excitation current induced by current source 118 may be introduced to the FC system 102 in a periodic and/or windowed fashion such that the current is introduced during one or more measurement periods (e.g., measurement periods of voltage sensor 108 and current sensor 110). The operation of the switched load 116 may be similarly periodic and/or windowed. In certain embodiments, the voltage sensor 108 and the current sensor 110 may be in communication with the switched load 116 and/or the current source 118 to synchronize excitation and measurement operations. For example, in certain embodiments, the excitation current introduced by current source 118 may be induced during 100 ms periods every 1 s of operation of the FC system 102. Inducing excitation currents in a periodic and/or windowed fashion may reduce the power consumed to generate the excitation signal over that consumed using conventional methods.

Figure 2:
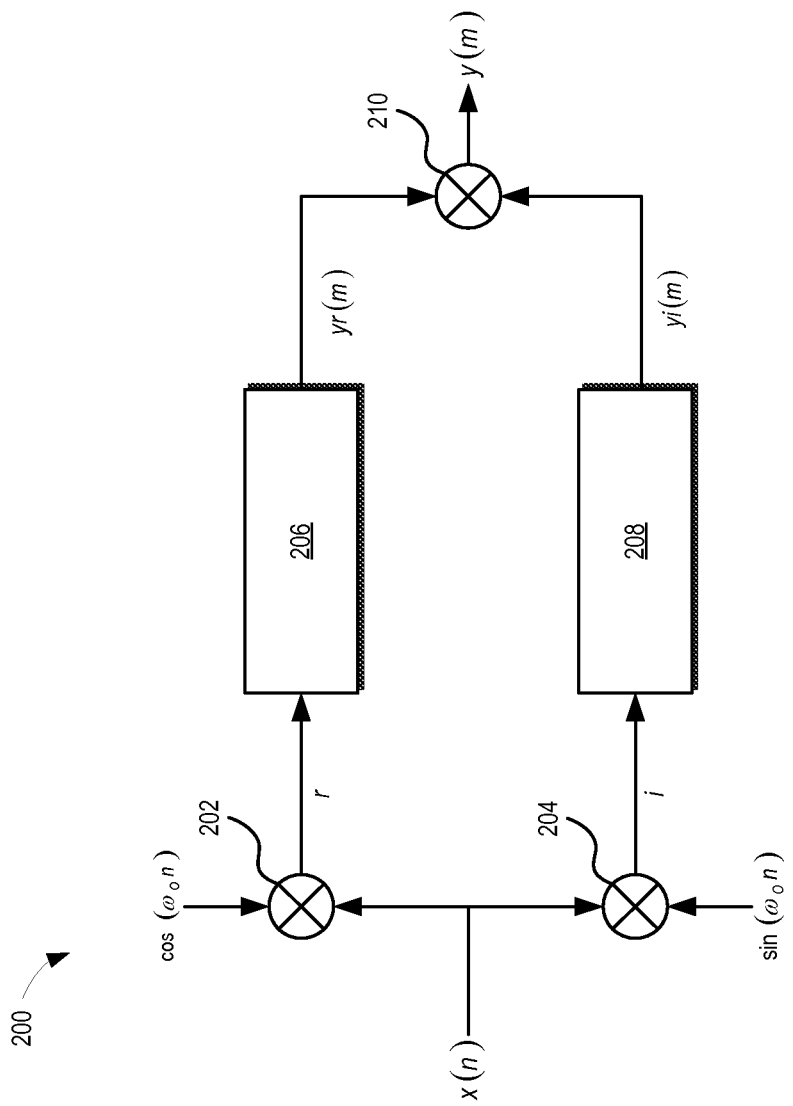
FIG. 2 illustrates an example of a filter utilized in measuring operating parameters of a FC system consistent with embodiments disclosed herein.

FIG. 2 illustrates an example of a filter 200 utilized in measuring operating parameters of a FC system consistent with embodiments disclosed herein. In certain embodiments, the filter 200 may be utilized in the system illustrated in FIG. 1. For example, the filter 200 may be utilized to filter a voltage signal measured by a voltage sensor and/or a current signal measured by a current sensor. In certain embodiments, the design of filter 200 may reduce the computational demands associated with calculating a high frequency resistance of a FC system.

As noted above, a high voltage distribution and/or FC system of a vehicle may be a relatively noisy electrical environment. Accordingly, filtering voltage and current signals associated with an excitation current and/or a switched load in a FC system may help to isolate such signals from other noise associated with the FC system. Filter 200 may perform such filtering operations, thereby resulting in more accurate high frequency resistance determinations. In certain embodiments, the filter 200 may be a subset of a multi-rate filter. By utilizing a subset of a multi-rate filter, certain computational loads associated with the filter 200 may be reduced over those associated with a conventional full multi-rate bandpass filter design.

As illustrated, filter 200 may receive an input signal x(n). The real and imaginary components of the input signal x(n) may be separated by frequency mixers 202 and 204 respectively. In certain embodiments, the sample rate of the separated component signals may be $f_s$. The real component of the input signal x(n) separated by frequency mixer 202 may be provided to a first decimation filter 206. The first decimation filter 206 may include a low-pass filter as an anti-aliasing filter to reduce the bandwidth of the real component of the input signal x(n) and a downsampler. In certain embodiments, the first decimation filter 206 may have a decimation factor of D.

The imaginary component of the input signal x(n) separated by frequency mixer 204 may be provided to a second decimation filter 208. Like the first decimation filter 206, the second decimation filter 208 may include a low-pass filter as an anti-aliasing filter to reduce the bandwidth of the imaginary component of the input signal x(n) and a downsampler. In certain embodiments, the second decimation filter 208 may have a decimation factor of D.

The filtered signal produced by the first decimation filter 206 may be denoted as yr(m) and the filtered signal produced by the second decimation filter 208 may be denoted as yi(m). The sample rate of yr(m) and yi(m) may be $f_s/D$, where D is the decimation factor of the first and second decimation filters 206, 208. Signals of yr(m) and yi(m) may be provided as inputs to frequency mixer 210. Based on these signals, frequency mixer 210 may output a filtered signal denoted as y(m). In certain embodiments, the filtered output signal y(m) may be given according to Equation 1 provided below:

$$y(m) = \sqrt{yr(m)^2 + yi(m)^2} \qquad \text{Equation 1}$$

In certain embodiments, filter 200 may be designed to exhibit various operating parameters including, for example, a 200 Hz pass band, 150 Hz transition bands, a maximally flat response in the pass band, 96.33 dB stop band attenuation, and/or operating flexibility from 1 KHz to 10 KHz, although other suitable operating parameters are also contemplated. A high frequency resistance determination may utilize the magnitude of measured voltage and/or current signals and, therefore, may not require reconstruction of the filtered voltage and/or current signals at an original sampling frequency. Accordingly, in some embodiments, filter 200 may not include a interpolation stage, thereby resulting in a substantial reduction of computational load (e.g., 50%) associated with the filter 200 over a conventional full multi-rate filter design.

Figure 3:
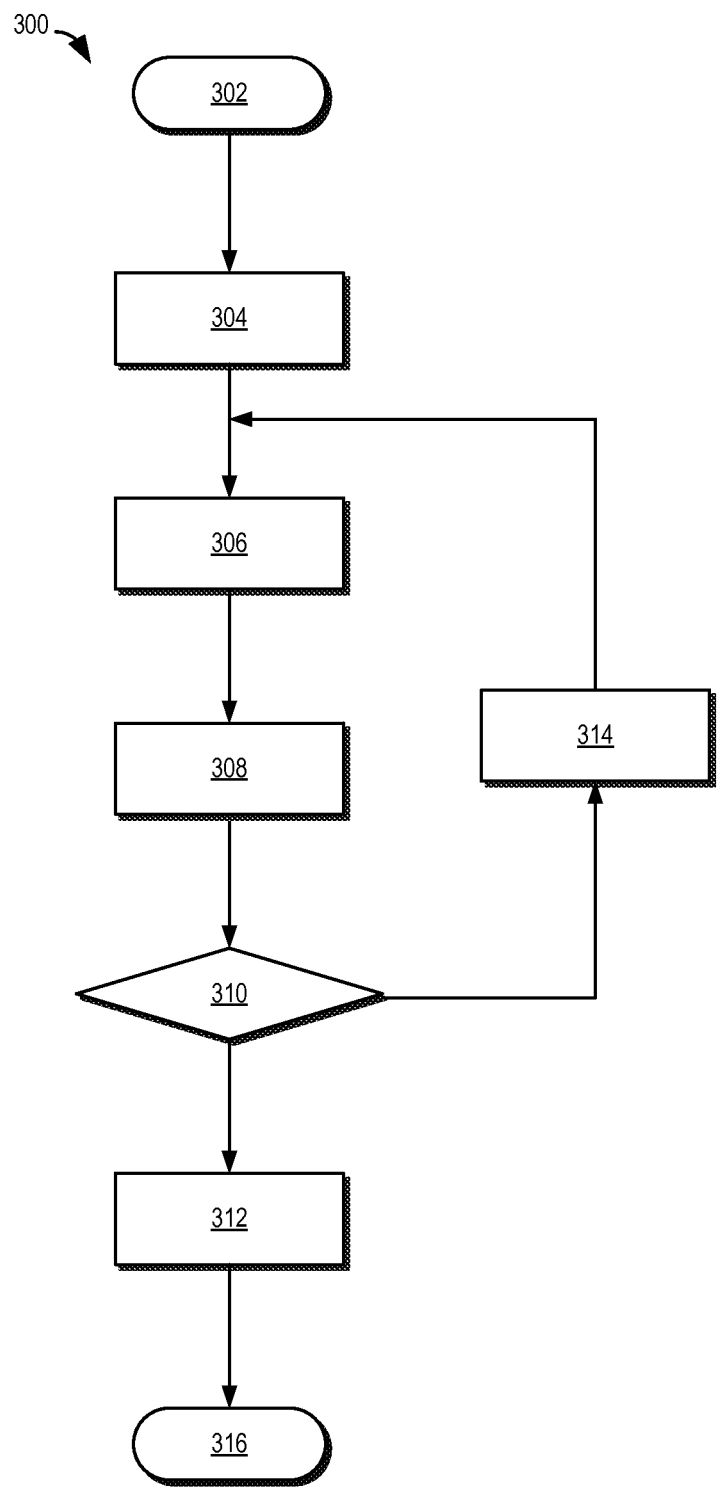
FIG. 3 illustrates a flow chart of an exemplary method for measuring operating parameters of a FC system consistent with embodiments disclosed herein.

FIG. 3 illustrates a flow chart of an exemplary method 300 for measuring operating parameters of a FC system consistent with embodiments disclosed herein. The illustrated method 300 may be performed using, at least in part, a vehicle computer system, an external computer system, a FC control system, an analog and/or digital filter system, and/or any other suitable system including the systems described above in reference to FIG. 1 and FIG. 2. At 302, the method 300 may be initiated. At 304, a switched load (e.g., a switched resistive load) coupled to the FC system may be switched at a desired center frequency of a high frequency resistance measurement. In certain embodiments, the center frequency may be a frequency within a specific band of excitation frequencies (e.g., between 500 Hz and 10,000 Hz) of the FC system.

The switched load may consume power generated by the FC system, thereby producing a voltage signal and a current signal (e.g., voltage and current ripples) at the center frequency of the switched load. At 306, these voltage and current signals may be measured. For example, the voltage signal at the center frequency may be measured by a voltage sensor. Similarly, the current signal at the center frequency may be measured by a current sensor (e.g., a current transformer and/or transducer).

At 308, the measured voltage and current sensors may be filtered. As noted above, a high voltage distribution system and/or a FC system of a vehicle may be relatively noisy electrical environments. Filtering voltage and current signals associated with a switched load and/or an induced excitation current in a FC system may help to isolate such signals from other noise associated with the FC system and improve the accuracy of high frequency resistance determinations. In certain embodiments, a filter design such as the subset of a multi-rate filter design described above in reference to FIG. 2 may be utilized, thereby reducing computational loads associated with the filtering process.

At 310, a determination may be made as to whether the filtered signal levels introduced by the switched load at 304 are sufficient to make an accurate high frequency resistance determination for the FC system. In certain embodiments, this may include comparing the filtered signal levels with one or more thresholds. If the filtered signal levels introduced by the switched load at 304 are sufficient to make an accurate high frequency resistance determination for the FC system, the method may proceed to 312. At 312, a high frequency resistance of the FC system may be calculated based on the filtered voltage and current signals. For example, in accordance with Ohm's law, a high frequency resistance of the FC system may be calculated by dividing the magnitude of the filtered voltage signal (e.g., a voltage ripple waveform) by the magnitude of the filtered current signal (e.g., a current ripple waveform). After calculating the high frequency resistance of the FC system, the method may terminate at 316.

Referring back to 310, if it is determined that the filtered signal levels introduced by the switched load at 304 are insufficient to make an accurate high frequency resistance calculation for the FC system, the method 300 may proceed to 314. At 314, a further excitation current may be induced through the FC system. For example, in certain embodiments, an alternating current may be introduced through the FC system by a current source. In further embodiments, the current source may include one or more end cell heaters associated with the FC system. In certain embodiments, the excitation current may be introduced in a periodic and/or windowed fashion such that the excitation current is introduced during one or more measurement periods (e.g., measurement periods associated with step 306).

After inducing the additional excitation current through the FC system at 314, the method 300 may proceed to perform the measurement 406, filtering 308, level determination 310, and high frequency resistance calculation 312 steps detailed above. Once a high frequency resistance is calculated at 312 utilizing the additional excitation current, the method 300 may proceed to terminate at 316.

In certain embodiments, the systems and methods disclosed herein may be implemented, at least in part, using one or more computer systems or processing devices. For example, certain features and functionality of a vehicle computer system, an external computer system, a FC control system, and/or a filter system may be implemented using a computer system. The systems and methods disclosed herein are not inherently related to any particular computer or other processing apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions that, when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a Bernoulli drive, a magnetic disk, a punch card, flash memory, integrated circuits, or any other non-transitory digital processing apparatus memory device.

Although the foregoing has been described in some detail for purposes of clarity, it will be apparent that certain changes and modifications may be made without departing from the principles thereof. For example, in certain embodiments, access points and/or discharging system connectors may use any combination of plugs, contacts, recessed elements, actuators, pins, recessed channels, mechanical and/or spring-actuated switches or relays, electrical actuated switches and/or any other suitable electrical system and/or mechanical system to facilitate the functionality of the access points and/or discharging system connectors described herein. Similarly, certain features of the embodiments disclosed herein may be configured and/or combined in any suitable configuration or combination. Additionally, certain systems and/or methods disclosed herein may be utilized in battery systems not included in a vehicle (e.g., a backup power battery system or the like). It is noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

As used herein, the terms "comprises" and "includes," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

The invention claimed is:

1. A system comprising:
a fuel cell system;
a switched load configured to be selectively coupled to the fuel cell system at a center frequency such that a first component of a current flow is induced across the fuel cell system when the switched load is coupled to the fuel cell system;
an excitation current source configured to induce a second component of the current flow across the fuel cell system at the center frequency;
a voltage sensor coupled to the fuel cell system configured to measure a voltage signal associated with the current flow;
a current sensor coupled to the fuel cell system configured to measure a current signal associated with the current flow;
a filtering system coupled to the voltage sensor and the current sensor configured to receive the voltage signal and the current signal and to generate a corresponding filtered voltage signal and a corresponding filtered current signal;
a processing system coupled to the filtering system configured to calculate a high frequency resistance of the fuel cell system based on the filtered voltage and current signals; and
wherein the processing system is configured to determine that levels of the filtered voltage and current signals exceed at least one threshold and, in response, cause the excitation current source to induce the second component of the current flow.

2. The system of claim 1, wherein the filtering system is further configured to isolate the voltage and current signals from noise signals measured by the voltage and current sensors to generate the corresponding filtered voltage and current signals.

3. The system of claim 1, wherein the switched load comprises a switched resistive load.

4. The system of claim 1, wherein the filtering system comprises:
a first filter configured to receive the voltage signal and to generate the filtered voltage signal; and
a second filter configured to receive the current signal and to generate the filtered current signal.

5. The system of claim 4 wherein the first filter and the second filter each comprise a subset of a multi-rate filter.

6. The system of claim 4, wherein the first filter comprises:
a first mixer configured to separate a real component of the received voltage signal;
a second mixer configured to separate an imaginary component of the received voltage signal;
a first decimation filter configured to receive the real component of the received voltage signal and to generate a filtered real voltage signal component;
a second decimation filter configured to receive the imaginary component of the received voltage signal and to generate a filtered imaginary voltage signal component; and
a third mixer configured to receive the filtered real voltage signal component and the filtered imaginary voltage signal component and to generate the filtered voltage signal.

7. The system of claim 4, wherein the second filter comprises:
a first mixer configured to separate a real component of the received current signal;
a second mixer configured to separate an imaginary component of the received current signal;
a first decimation filter configured to receive the real component of the received current signal and to generate a filtered real current signal component;
a second decimation filter configured to receive the imaginary component of the received current signal and to generate a filtered imaginary current signal component; and
a third mixer configured to receive the filtered real current signal component and the filtered imaginary current signal component and to generate the filtered current signal.

8. The system of claim 1, wherein switched load is further configured to be selectively coupled to the fuel cell system at the center frequency during one or more measurement periods such that the first component of the current flow is induced across the fuel cell system when the switched load is coupled to the fuel cell system.

9. The system of claim 1, wherein the excitation current source is further configured to induce the additional voltage signal and the second component of the current flow through the fuel cell system during one or more measurement periods.

10. A method for determining a high frequency resistance of a fuel cell system, the method comprising
- inducing a first component of a current signal and a voltage signal through the fuel cell system at a center frequency using a switched load;
- inducing a second component of a current signal and a voltage signal through the fuel cell system at the center frequency using an excitation current source;
- measuring the current signal and the voltage signal;
- filtering the current signal and the voltage signal to isolate the current signal and the voltage signal from noise in the fuel cell system;
- calculating the high frequency resistance of the fuel cell system based on the filtered current signal and voltage signal; and
- wherein inducing the second component of the current signal and the voltage signal through the fuel cell system is in response to determining that levels of the filtered current and voltage signals exceed at least one threshold.

11. The method of claim 10, wherein the center frequency is a frequency between 500 Hz and 10,000 Hz.

12. The method of claim 10, wherein the excitation current source comprises one or more end cell heaters included in the fuel cell system.

13. The method of claim 10, wherein filtering the current signal and the voltage signal further comprises:
- filtering the current signal using a first filter comprising a subset of a multi-rate filter; and
- filtering the voltage signal using a second filter comprising a subset of a multi-rate filter.

14. The method of claim 10, wherein calculating the high frequency resistance of the fuel cell system comprises:
- dividing a magnitude of the filtered voltage signal by a magnitude of the filtered current signal to generate the high frequency resistance.

15. The method of claim 10, wherein measuring the current signal and the voltage signal comprises measuring the current signal and the voltage signal during one or more measurement periods.

16. The method of claim 10, wherein inducing the second component of the current signal and voltage signal comprises inducing the second component during one or more measurement periods.

17. The method of claim 10, wherein the method further comprises scaling the calculated high frequency resistance by a number of cells included in the fuel cell system.

* * * * *